(12) United States Patent
Hasegawa et al.

(10) Patent No.: US 7,836,842 B2
(45) Date of Patent: Nov. 23, 2010

(54) COATING APPARATUS

(75) Inventors: Koji Hasegawa, Itami (JP); Hiroshi Matuura, Itami (JP); Yasukazu Nishimura, Itami (JP)

(73) Assignee: Kabushiki Kaisha Powrex, Itami-shi (JP)

( * ) Notice: Subject to any disclaimer, the term of this patent is extended or adjusted under 35 U.S.C. 154(b) by 763 days.

(21) Appl. No.: 10/579,559

(22) PCT Filed: Jul. 15, 2005

(86) PCT No.: PCT/JP2005/013137

§ 371 (c)(1),
(2), (4) Date: Mar. 26, 2007

(87) PCT Pub. No.: WO2006/009102

PCT Pub. Date: Jan. 26, 2006

(65) Prior Publication Data

US 2007/0261634 A1 Nov. 15, 2007

(30) Foreign Application Priority Data

Jul. 20, 2004 (JP) ............................. 2004-212113

(51) Int. Cl.
*B05C 5/00* (2006.01)
*B05B 3/00* (2006.01)
*A23G 3/26* (2006.01)

(52) U.S. Cl. ............................ 118/24; 118/19; 118/29; 118/323; 118/20; 118/30

(58) Field of Classification Search ................... 118/13, 118/19, 20, 24, 29, 30, 303, 319, 321, 323, 118/418; 366/188; 34/132–134; 427/212
See application file for complete search history.

(56) References Cited

U.S. PATENT DOCUMENTS 3,357,398 A * 12/1967 Gross ......................... 118/418

(Continued)

FOREIGN PATENT DOCUMENTS

CN 2547389 4/2003

(Continued)

OTHER PUBLICATIONS

Chinese Office Action issued Apr. 11, 2008 for Chinese Application No. 200580001118.5 w/English translation.

(Continued)

*Primary Examiner*—Yewebdar T Tadesse
(74) *Attorney, Agent, or Firm*—Wenderoth, Lind & Ponack, L.L.P.

(57) ABSTRACT

Provided is a coating apparatus, which has satisfactory operability at a time of installing or exchanging a spray nozzle, is not complicated in structure, and is advantageous in terms of layout. A rotary drum (2) is rotated around an axis (A) inclined with respect to a horizontal line, and has an opening (5) at one end on an inclination upper side. A spray nozzle unit (10) is removably attached to a swing arm (34), and the swing arm (34) can swing with respect to a swing axis (34c). Owing to the swing operation of the swing arm (34), the swing nozzle unit (10) can be moved between the inside and the outside of the rotary drum (2).

8 Claims, 13 Drawing Sheets

U.S. PATENT DOCUMENTS

| | | | |
|---|---|---|---|
| 4,264,543 | A | 4/1981 | Valenta |
| 4,543,906 | A | 10/1985 | Glatt et al. |
| 4,702,932 | A | 10/1987 | Cosentino et al. |
| 5,344,599 | A | 9/1994 | Grill et al. |
| 6,435,864 | B2 | 8/2002 | Slade et al. |
| 6,511,541 | B2 * | 1/2003 | Pentecost ............ 118/303 |
| 6,557,486 | B2 * | 5/2003 | Giogoli ............ 118/19 |
| 2007/0261634 | A1 * | 11/2007 | Hasegawa et al. ............ 118/319 |

FOREIGN PATENT DOCUMENTS

| | | |
|---|---|---|
| EP | 0 148 772 | 7/1985 |
| GB | 1 072 328 | 6/1967 |
| JP | 60-227855 | 11/1985 |
| JP | 63-18429 | 1/1988 |
| JP | 63-18429 Y2 | 5/1988 |
| JP | 3-254830 | 11/1991 |
| JP | 6-500305 | 1/1994 |
| JP | 7-236998 | 9/1995 |
| JP | 9-66227 | 3/1997 |
| WO | 92/04111 | 3/1992 |

OTHER PUBLICATIONS

European Search Report mailed Oct. 24, 2008 for European Application No. 05766190.2.

* cited by examiner

COATING APPARATUS

BACKGROUND OF THE INVENTION

1. Field of the Invention

The present invention relates to a coating apparatus for performing coating, mixing, drying, etc. of particles of a drug, food, agricultural chemicals, etc., and more particularly to a coating apparatus with a rotary drum that is rotated around an axis.

2. Description of the Related Art

In order to provide a film coating, a sugar coating, or the like to a tablet, a soft capsule, a pellet, a granule, and the like (hereinafter, collectively referred to as "particles") of a drug, food, agricultural chemicals, etc., a coating apparatus with a rotary drum is used.

This type of coating apparatus is also called a pan coating apparatus, and as described, for example, in JP 2003-1083 A, JP 07-328408 A, JP 58-500748 A, JP 2004-97853 A, and JP 2726062 B, the rotary drum includes a body in a polygonal tube shape or a cylindrical shape, and a front wall and a back wall extending from the body in back-and-forth directions, and is placed rotatably around a horizontal axis. Ventilation portions composed of porous portions are provided over the entire circumference of the body or at a plurality of positions of the circumference, and a ventilation jacket covers an outer circumferential side of the respective ventilation portions to form ventilation channels. Each ventilation channel communicates with a supply air duct or an exhaust duct when the ventilation channel reaches a predetermined position along with the rotation of the rotary drum. Thus, treatment gas (e.g., dry air) with the temperature controlled to a predetermined temperature is supplied from the supply air duct into the rotary drum through the ventilation channels and the ventilation portions, and the dry air in the rotary drum is exhausted to the exhaust duct through the ventilation portions and the ventilation channels.

When the rotary drum rotates in a predetermined direction, a particle layer (rolling floor of particle grains) is formed in the rotary drum. Then, a spray solution such as a film agent solution is sprayed onto the particle layer from a spray nozzle placed in the rotary drum, and coating treatment is thus performed.

The spray nozzle for spraying a spray solution is attached to a nozzle support member provided inside a rotary drum in a fixed manner in JP 2003-1083 A and JP 07-328408 A. The nozzle support member is inserted into a hollow driving axis provided on the side of a back end of the rotary drum in JP 2003-1083 A, and is cantilevered at a front end of the rotary drum, and extends toward the side of the back end in JP 07-328408 A. On the other hand, in JP 58-500748 A, the nozzle support member is structured so as to be movable in an axial direction of the rotary drum by means of a slide mechanism, and can be moved through an opening of the front end of the rotary drum.

Furthermore, as described in JP 2004-97853 A and JP 2726062 B, this type of coating apparatus is mostly provided with a discharging mechanism for automatically discharging particle products which have undergone coating treatment. This discharging mechanism is mainly composed of an discharging member provided inside the rotary drum, and rotates the rotary drum in a forward direction (in the same direction as that during treatment of particles) or in a backward direction (in a direction opposite to that during treatment of particles) during discharge, thereby picking up particle products inside the rotary drum with the discharging member, and guiding it to an opening of the front end. Such a discharging member may be attached to the rotary drum only during discharge (JP 2004-97853 A), or may be permanently placed inside the rotary drum (JP 2726062 B). In the former case, the rotation direction of the rotary drum during discharge is either the forward direction or the backward direction, depending upon the setting of the discharging member. In the latter case, the rotation direction of the rotary drum during discharge is always a backward direction.

First, regarding the arrangement of the spray nozzle, in JP 2003-1083 A and JP 07-328408 A, the spray nozzle is attached to the nozzle support member placed inside the rotary drum in a fixed manner, so it is necessary to perform an attachment/detachment operation by inserting hands in the rotary drum at a time of installing or exchanging the spray nozzle, which results in poor operability. On the other hand, in JP 58-50748 A, at a time of installing or exchanging the spray nozzle, the nozzle support member is moved in an axial direction with the slide mechanism, and the nozzle support member can thus be pulled out from the rotary drum. In this case, although the operability is better than that as disclosed in JP 2003-1083 A and JP 07-328408 A, it is necessary to provide the slide mechanism separately, thereby making the configuration of the apparatus be complicated. Furthermore, since the nozzle support member is moved in the axial direction to be pulled out from the rotary drum, a relatively large space is required on a front side of the rotary drum, which may make the layout of the apparatus difficult.

Next, regarding the discharge of particle products, in the discharging mechanism as disclosed in JP 2004-97853 A and JP 2726062 B, the particle products remain in a discharging path, depending upon the shape, property, a discharge amount per unit time, and other conditions of the particle products, with the result that efficient discharge may not be performed.

SUMMARY OF THE INVENTION

An object of the present invention is to provide a coating apparatus which has satisfactory operability at a time of installing or exchanging a spray nozzle, is not complicated in structure, and is advantageous in terms of the layout.

Another object of the present invention is to provide a coating apparatus capable of efficiently discharging particle products.

In order to achieve the above-mentioned object, according to the present invention, there is provided a coating apparatus including: a rotary drum in which particles to be treated is accommodated; and a spray nozzle unit placed in the rotary drum, in which the rotary drum is rotated around an axis inclined with respect to a horizontal line, and has an opening at one end on an inclination upper side; the spray nozzle unit is removably attached to a swing arm, the swing arm is swingable around a swing pivot set outside of the rotary drum; and owing to a swing operation of the swing arm, the spray nozzle unit is capable of being moved between an inside and an outside of the rotary drum.

With the above construction, the coating apparatus is provided with a liquid tube holder for holding a liquid tube of a spray solution connected to the spray nozzle unit, and the liquid tube holder may be removably attached to the swing arm.

Further, with the above construction, an air tube of compressed air to be connected to the spray nozzle unit may be inserted in the swing arm.

Still further, with the above construction, the coating apparatus further includes a discharging mechanism for discharging particle products which have undergone coating treatment from an inside of the rotary drum, and at least a partial surface of a discharging path of the particle products may be formed of a surface with unevenness for improving a sliding property.

At a time of installing or exchanging the spray nozzle, the spray nozzle unit can be pulled out from the rotary drum by a swing operation of a swing arm, so operations of installing or exchanging the spray nozzle unit can be performed efficiently.

It is not necessary to provide a complicated mechanism such as a conventional slide mechanism, thereby making it possible to obtain a simple configuration of the apparatus. Further, since the spray nozzle unit can be moved by a swing operation, compared with a conventional configuration in which the spray nozzle unit is moved by a operation in an axial direction, a space to be kept on a front side of the rotary drum may be smaller, which is advantageous in terms of the layout of the apparatus.

By attaching the liquid tube holder to the swing arm removably, the spray nozzle unit, the liquid tube of a spray solution, and the liquid tube holder can be attached/detached with respect to the swing arm as one cassette in such a state that they are assembled. Therefore, the operations of installing or exchanging the spray nozzle unit can be performed more efficiently.

By inserting the air tube of compressed air connected to the spray nozzle unit into the swing arm, a portion where the air tube is exposed to inside and outside of the apparatus is reduced, thereby making it possible to improve the appearance of the entire apparatus.

By forming at least a partial surface of the discharging path of particle products, of the surface provided with unevenness for improving a sliding property, particle products do not remain during discharge, thereby making it possible to perform efficient discharging.

DESCRIPTION OF THE PREFERRED EMBODIMENT

Hereinafter, an embodiment of the present invention will be described with reference to the drawings.

Figure 1:
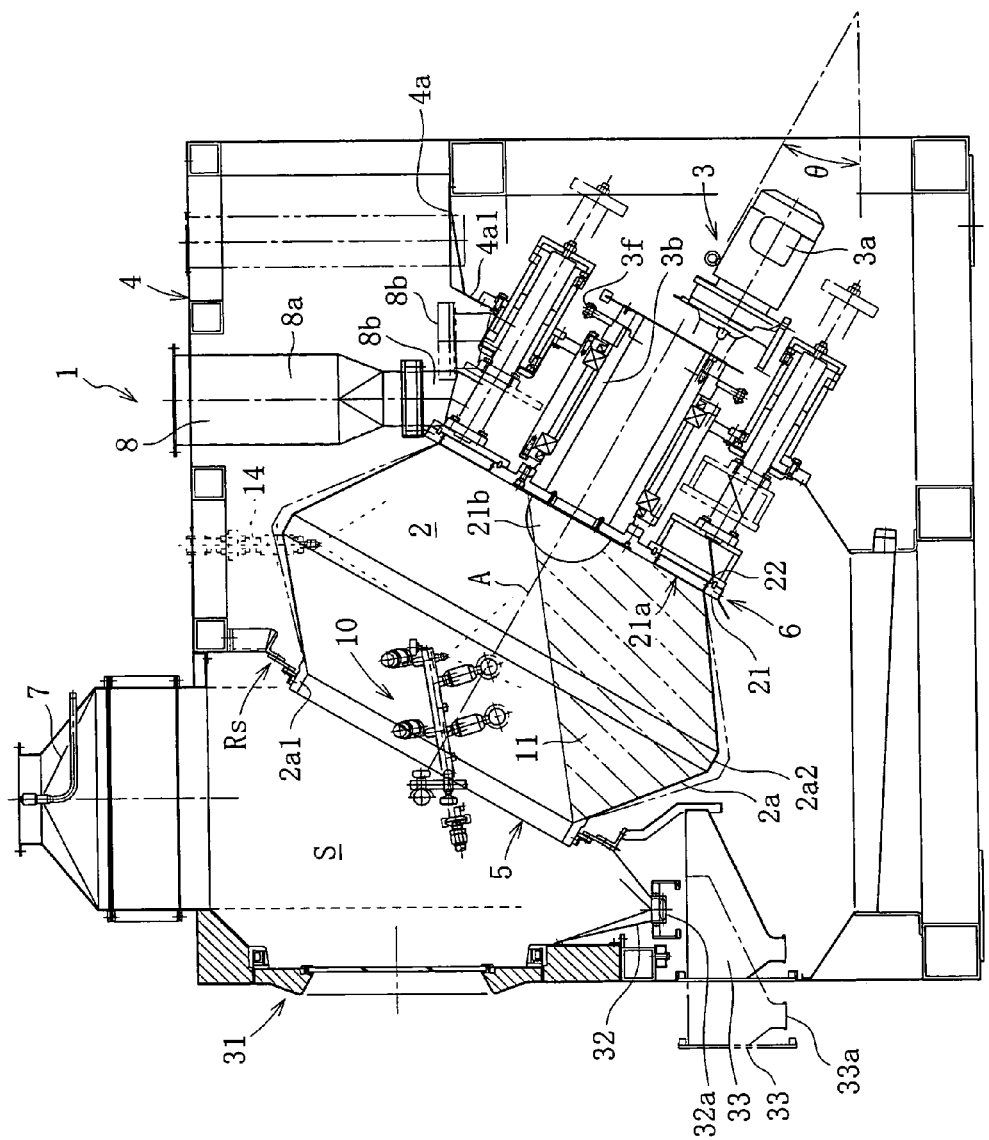
FIG. 1 is a partial vertical cross-sectional view showing an entire configuration of a coating apparatus according to an embodiment of the present invention.

FIG. 1 shows a coating apparatus 1 according to this embodiment. The coating apparatus 1 includes a rotary drum 2 placed rotatably around an axis A inclined by a predetermined angle θ (e.g., θ=30°) with respect to a horizontal line, and a rotation driving mechanism 3 for rotating the rotary drum 2 in a forward direction and/or a backward direction, and the rotary drum 2 and the rotation driving mechanism 3 are accommodated in a casing 4 formed of a stainless steel plate or the like.

Figure 8:
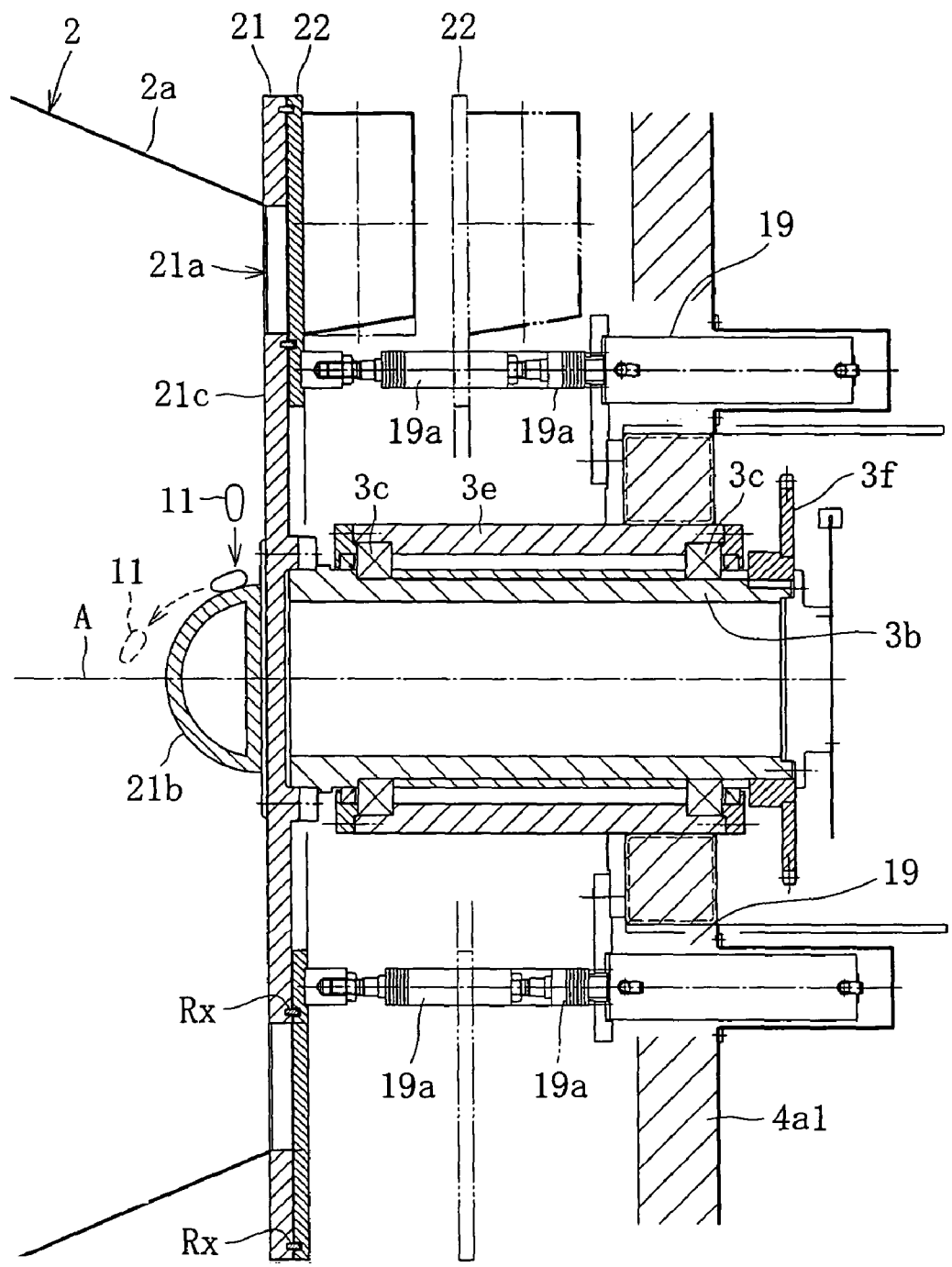
FIG. 8 is a partial cross-sectional view showing aback portion of a rotary drum.
Figure 9:
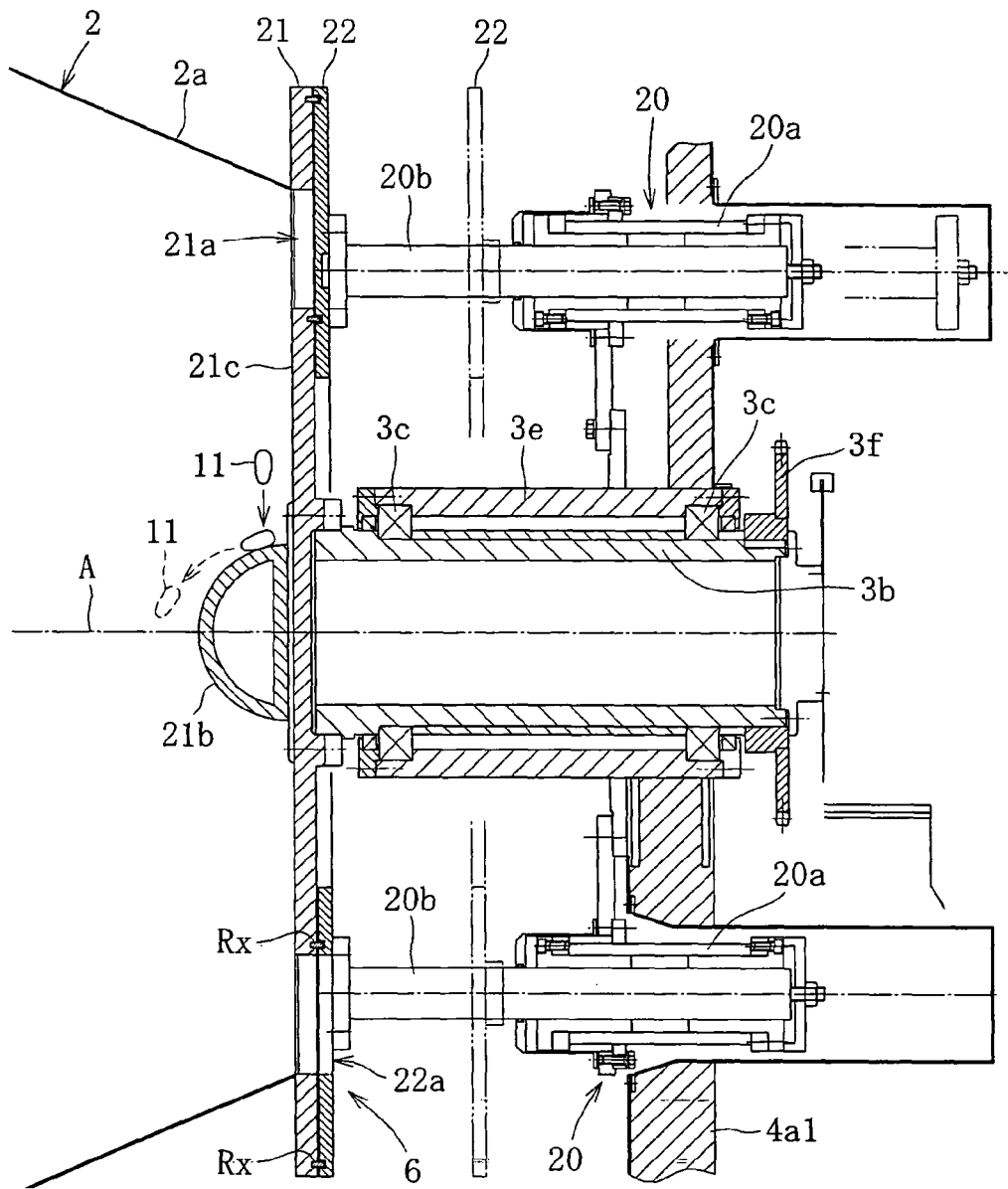
FIG. 9 is a partial cross-sectional view showing aback portion of the rotary drum.

The rotation driving mechanism 3 is configured so as to input a torque of, for example, a driving motor 3a with a speed reducer to a hollow driving axis 3b connected to a back end (end on an inclination lower side) of the rotary drum 2 through a chain (not shown) and a sprocket 3f. In this case, the rotary drum 2 as well as the driving axis 3b are supported rotatably on an inclined wall portion 4a1 orthogonal to the axis A in an inner partition wall portion 4a of the casing 4 via a bearing. To be more specific, as shown in FIGS. 8 and 9, a cylindrical housing 3e is fixed on the inclined wall portion 4a1, and the driving axis 3b is inserted in an inner hole of a cylindrical housing 3e and is supported rotatably by a bearing 3c. Then, the sprocket 3f is attached to the back end of the driving axis 3b so as to be integrally rotatable.

Figure 2:
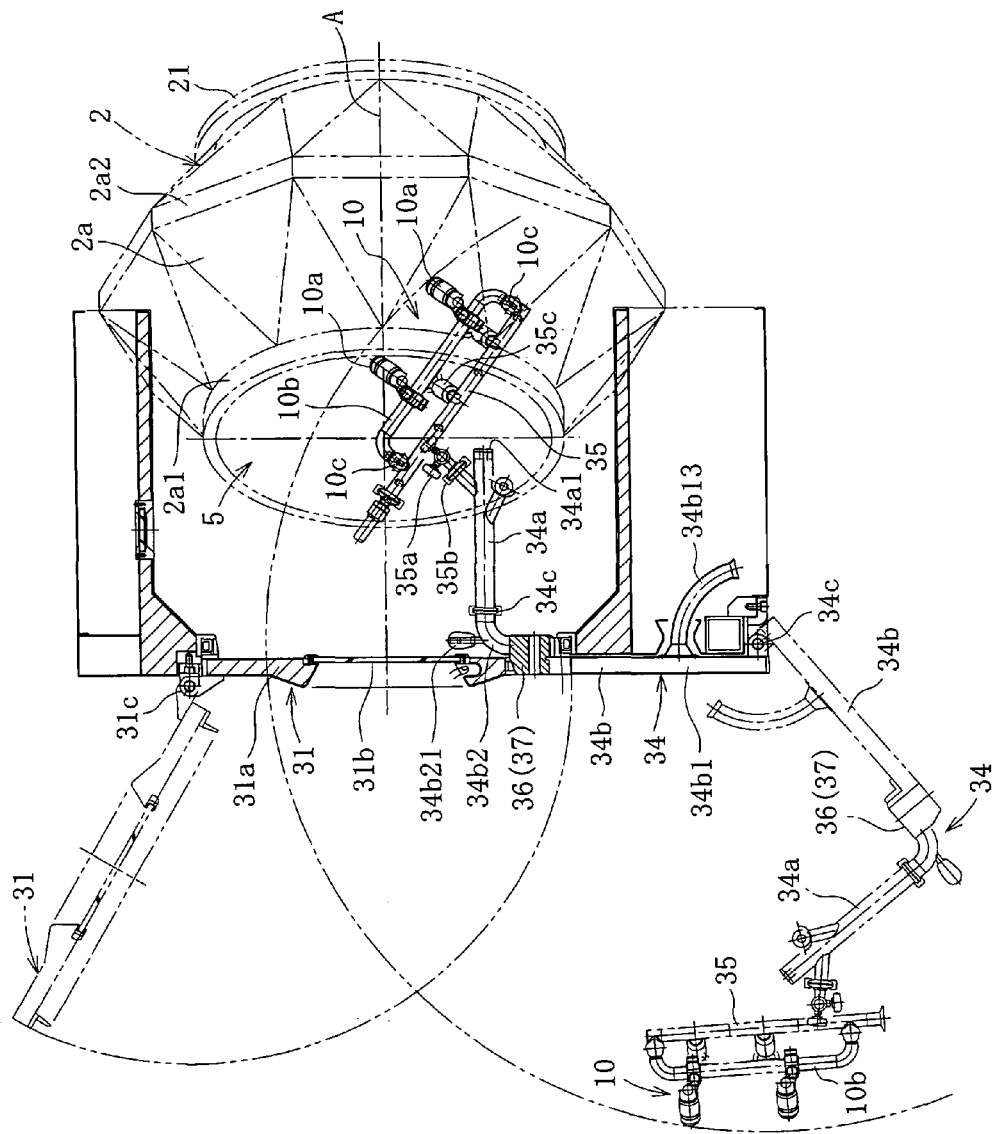
FIG. 2 is a partial cross-sectional view showing a front portion of the coating apparatus.

As represented by a chain line of FIG. 2, the rotary drum 2 includes a front end (end on an inclination upper side), a back end (end on an inclination lower side), and a peripheral wall portion 2a connecting the front end to the back end in a direction of the axis A. In this embodiment, the peripheral wall portion 2a is formed in a polygonal tube shape (polygonal shape in a horizontal cross-section), and a shape whose diameter gradually increases from the front end and the back end to a center in an axial direction. The horizontal cross-section including a large diameter portion 2a2 of the peripheral wall portion 2a is a polygon (e.g., a decagon) orthogonal to the axis A. The peripheral wall portion 2a is formed of a metal plate without ventilation holes (porous portions), such as a stainless steel plate, and a portion where the diameter gradually decreases from the large diameter portion 2a2 to the front end and the back end is formed by alternately coupling a plurality of triangle portions whose apex is directed to a front side and a plurality of triangle portions whose apex is directed to a back side in a circumferential direction. On the other hand, the front end is composed of an annular portion 2a1, and the back end is composed of a first disk plate 21 of a ventilation mechanism 6 described later. The front end is opened over its entire range, and the opening 5 functions as a ventilation port of treatment gas such as dry air (hot air or cold air). On an inner surface of the peripheral wall portion 2a, if required, a baffle for mixing and stirring a particle layer may be provided.

As shown in FIG. 1, a ventilation duct 7 is attached to an upper wall portion on the front side of the casing 4, and a ventilation duct 8 is attached to an upper wall portion on the back side of the casing 4.

In a front upper portion of the casing 4, a circulation space S of treatment gas including the opening 5 of the rotary drum 2 and a ventilation port of the ventilation duct 7 is formed. The back side of the circulation space S is sealed with respect to outside air with a labyrinth seal Rs provided on an outer circumferential side of the annular portion 2a1 of the rotary drum. Furthermore, on the front side of the circulation space S, a front lid 31 that can be opened/closed is provided, and on the lower side of the circulation space S, a discharging bucket 32 is provided. A discharging port 32a of the discharging bucket 32 is closed during treatment of particles (tablets, etc.), and opened during discharge of particle products or during cleaning of the inside of the apparatus. Furthermore, a discharging chute 33 is provided below the discharging bucket 32. The discharging chute 33 can be pulled out from the casing 4 during discharge of particle products, as represented by a chain line of FIG. 1. Furthermore, a spray nozzle unit 10 spraying a spray solution such as a coating solution is placed inside the rotary drum 2.

Figure 3:
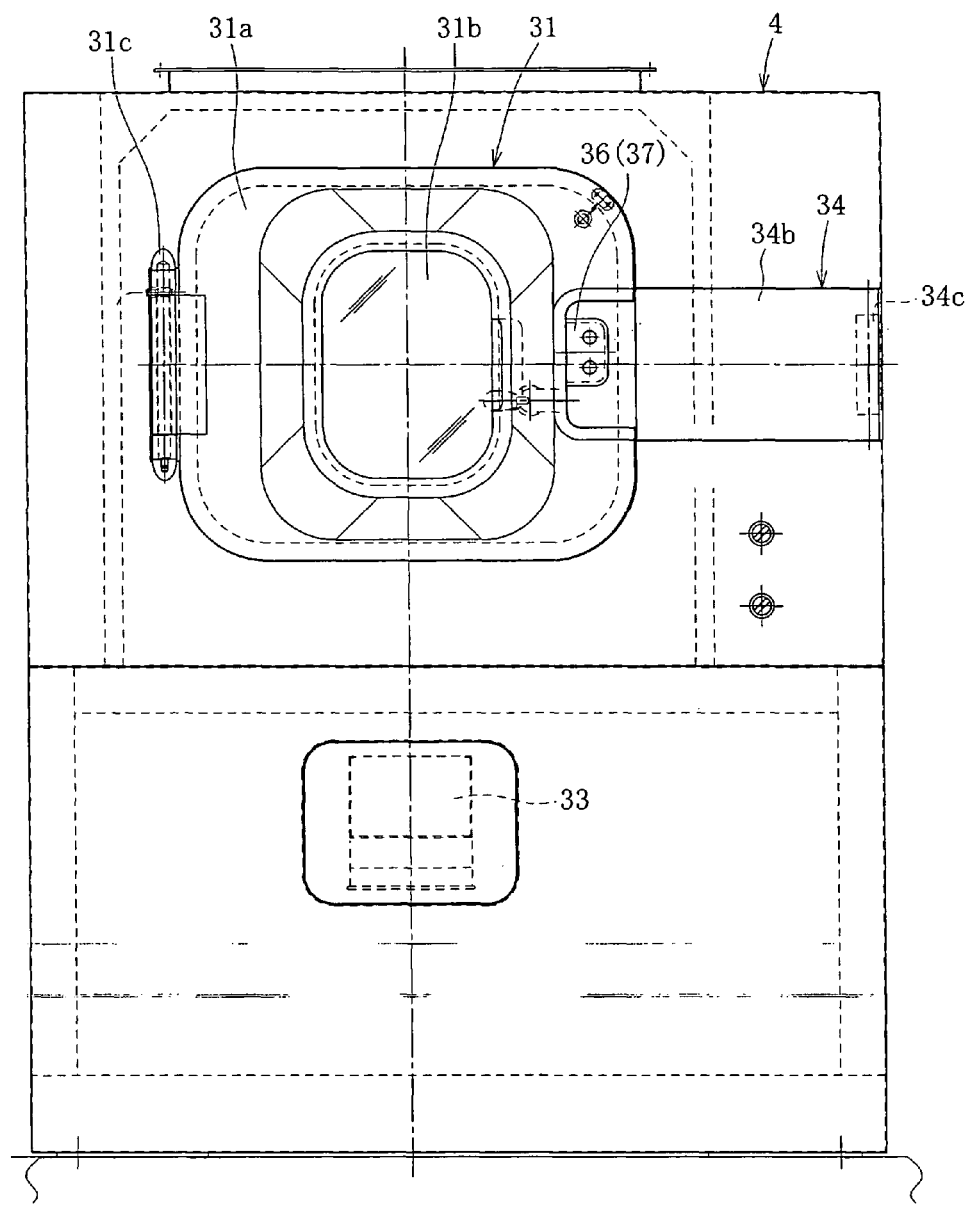
FIG. 3 is a front view of the coating apparatus.

As shown in FIGS. 2 and 3, the front lid 31 is composed of a frame portion 31a formed of a stainless steel plate or the like and a inspection window portion 31b attached to a center of the frame portion 31a, and is attached swingably to a swing axis 31c provided close to one side of a front wall portion of the casing 4. The inspection window portion 31b is formed of a transparent glass plate or plastic plate, so the inside of the rotary drum 2 can be visually recognized from the outside via the inspection window portion 31b.

The spray nozzle unit 10 is removably attached to the tip end of a swing arm 34. In this embodiment, the spray nozzle unit 10 is composed of one or a plurality of (for example, two) spray nozzles 10a, and a nozzle support member 10b supporting the spray nozzle 10a. Each spray nozzle 10a is removably attached to the nozzle support member 10b with a support metal fitting, and the position of the nozzle support member 10b can be adjusted in a longitudinal direction and around a center by adjusting the support metal fitting. Furthermore, in this embodiment, the nozzle support member 10b is attached to the swing arm 34 via a cleaning solution pipe 35. To be more specific, the nozzle support member 10b is removably attached to the cleaning solution pipe 35 with, for example, a screw fixture 10c, and the cleaning solution pipe 35 is removably attached to the swing arm 34, for example, with a screw fixture 35a and a Ferrule clamp 35b. However, the spray nozzle unit 10 as well as the nozzle support member 10b are not limited to such configurations, and may be directly attached removably to the tip end of the swing arm 34. The cleaning solution pipe 35 is supplied with a cleaning solution via a cleaning solution tube (not shown). Then, the cleaning solution is ejected from a cleaning nozzle 35c connected to the cleaning solution pipe 35 to the inside of the rotary drum 2, whereby the inside of the rotary drum 2 is cleaned.

Furthermore, in this embodiment, the swing arm 34 is composed of a first arm portion 34a on a tip end side and a second arm portion 34b on a base end side, and the base end side of the second arm portion 34b is attached swingably to a swing axis 34c provided on the other side portion of the front wall portion of the casing 4.

Figure 7A:
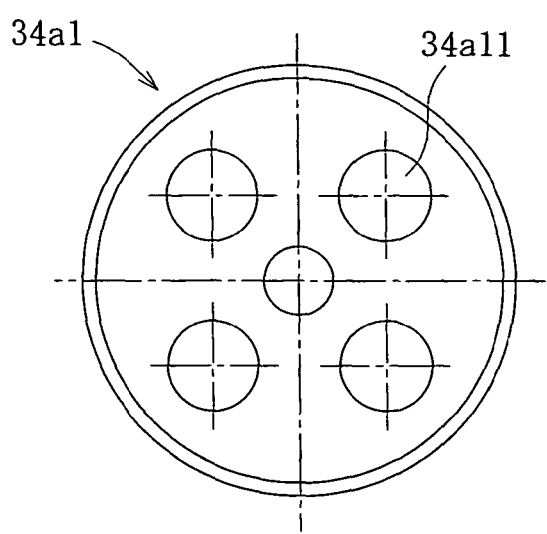
FIG. 7A is a front view of an air tube holder.
Figure 7B:
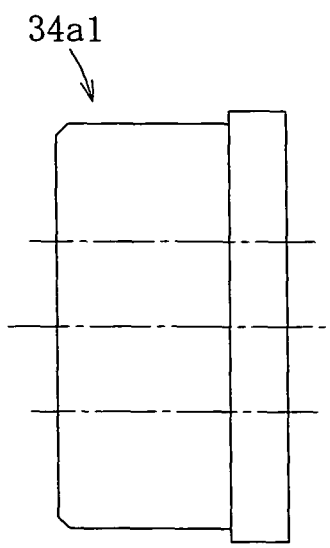
FIG. 7B is a side view of the air tube holder.

The first arm portion 34a is in a hollow pipe shape, and the base end portion thereof is connected to the second arm portion 34b with, for example, a Ferrule clamp 34c. Furthermore, an air tube holder 34a1 as shown in FIG. 7 is fitted in a tip end opening of the first arm 34a. The air tube holder 34a1 is formed of a resin material (e.g., a silicon resin (SR50, etc.)) having a relatively large elasticity, and is provided with one or a plurality of through-holes 34a11. An air tube of the spray nozzle 10a (e.g., a flexible air hose) is inserted to be held in the through-hole 34a11.

Figure 4A:
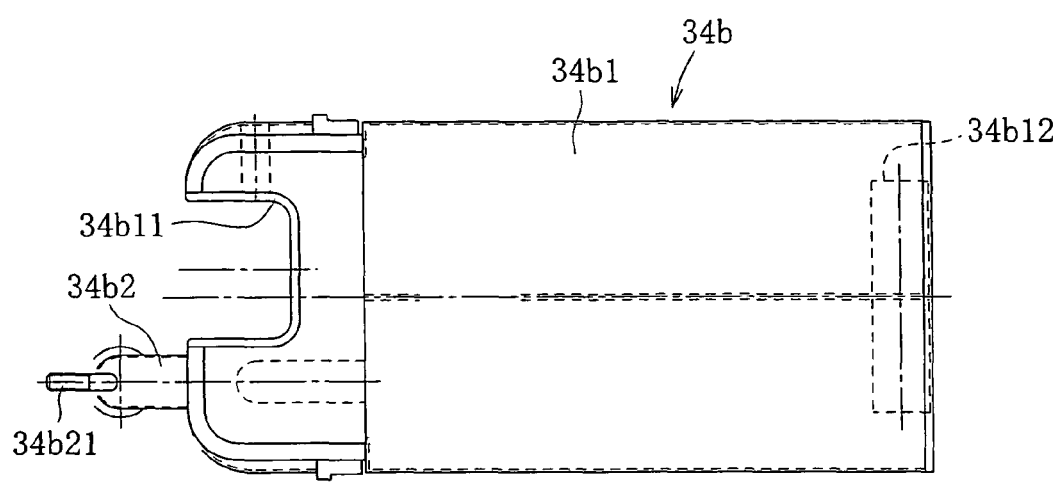
FIG. 4A is a side view showing a second arm portion of a swing arm.
Figure 4B:
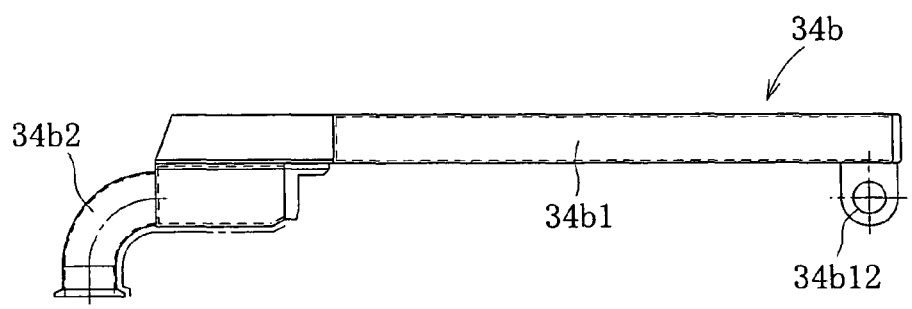
FIG. 4B is a plan view of the second arm portion of the swing arm.

FIG. 4 shows the second arm portion 34b of the swing arm 34. The second arm portion 34b includes, for example, a main portion 34b1 formed in a hollow horizontally oriented rectangular shape, and an elbow portion 34b2 formed in a hollow pipe shape connected to the tip end portion of the main portion 34b1. The hollow portion of the main portion 34b1 and the hollow portion of the elbow portion 34b2 communicate with each other. Furthermore, at a tip end portion of the main portion 34b1, a substantially U-shaped attachment portion 34b11, to which a liquid tube holder 36 or 37 described later is fitted, is provided, and at a back end portion of the main portion 34b1, a hinge 34b12 attached to the swing axis 34c is provided. Furthermore, a grip 34b21 used for swinging the swing arm 34 is attached to the elbow portion 34b2.

Furthermore, as shown in FIG. 2, a guide tube 34b13 of the air hose is connected to an inner wall of the main portion 34b1. A hollow portion of the guide tube 34b13 communicates with a hollow portion of the main portion 34b1. The air hose is guided to the hollow portion of the main portion 34b1 via the guide tube 34b13, is pulled out from the through-hole 34a11 of the air tube holder 34a1 through the hollow portions of the main portion 34b1 and the elbow portion 34b2, and then, is connected to each spray nozzle 10a. Usually, three air hoses for nebulizing air (atomizing air), spray pattern adjusting air, and nozzle opening/closing air (air for operating a needle of the spray nozzle 10a) are connected to the spray nozzles 10a, respectively.

Figure 5A:
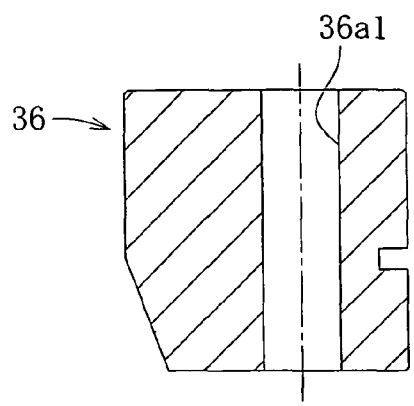
FIG. 5A is a cross-sectional view taken along the line a-a of FIG. 5B, showing a liquid tube holder.
Figure 5B:
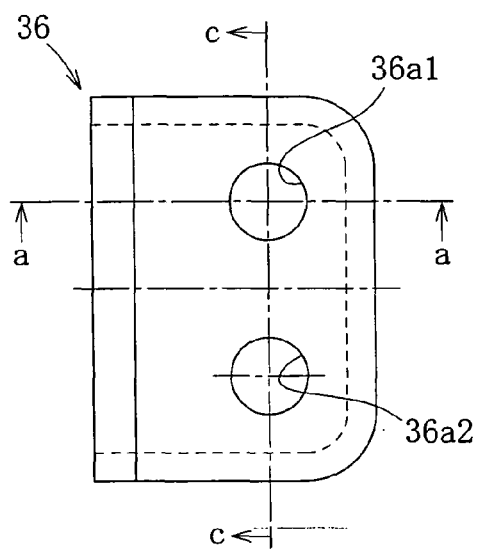
FIG. 5B is a front view of the liquid tube holder.
Figure 5C:
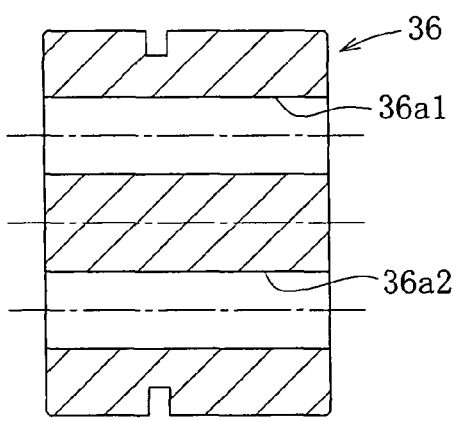
FIG. 5C is a cross-sectional view of the liquid tube holder taken along the line c-c of FIG. 5B.
Figure 6A:
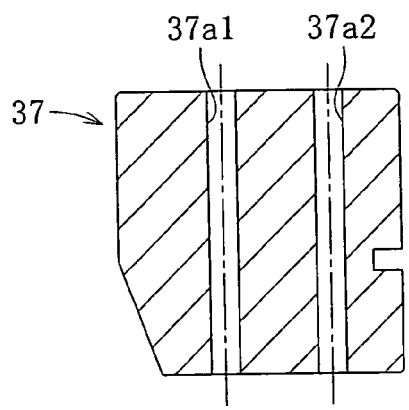
FIG. 6A is a cross-sectional view taken along the line a-a of FIG. 6B, showing a liquid tube holder.
Figure 6B:
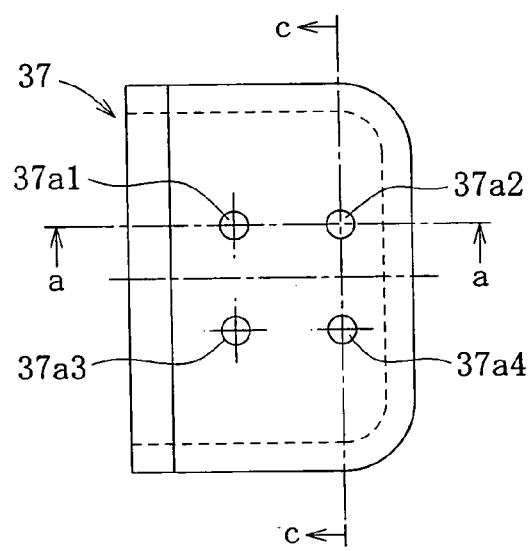
FIG. 6B is a front view of the liquid tube holder.
Figure 6C:
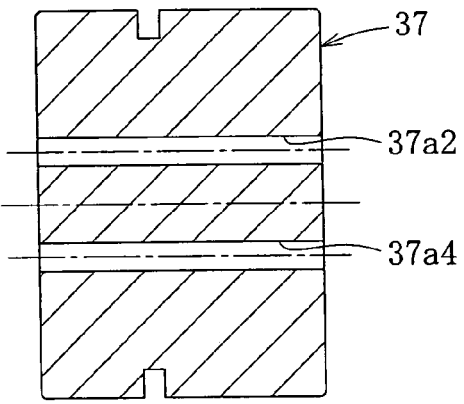
FIG. 6C is a cross-sectional view of the liquid tube holder taken along the line c-c of FIG. 6B.

FIGS. 5 and 6 show liquid tube holders 36 and 37. The liquid tube holders 36 and 37 are formed of a resin material (e.g., silicon resin (SR50, etc.)) having a relatively large elasticity.

Figure 14:
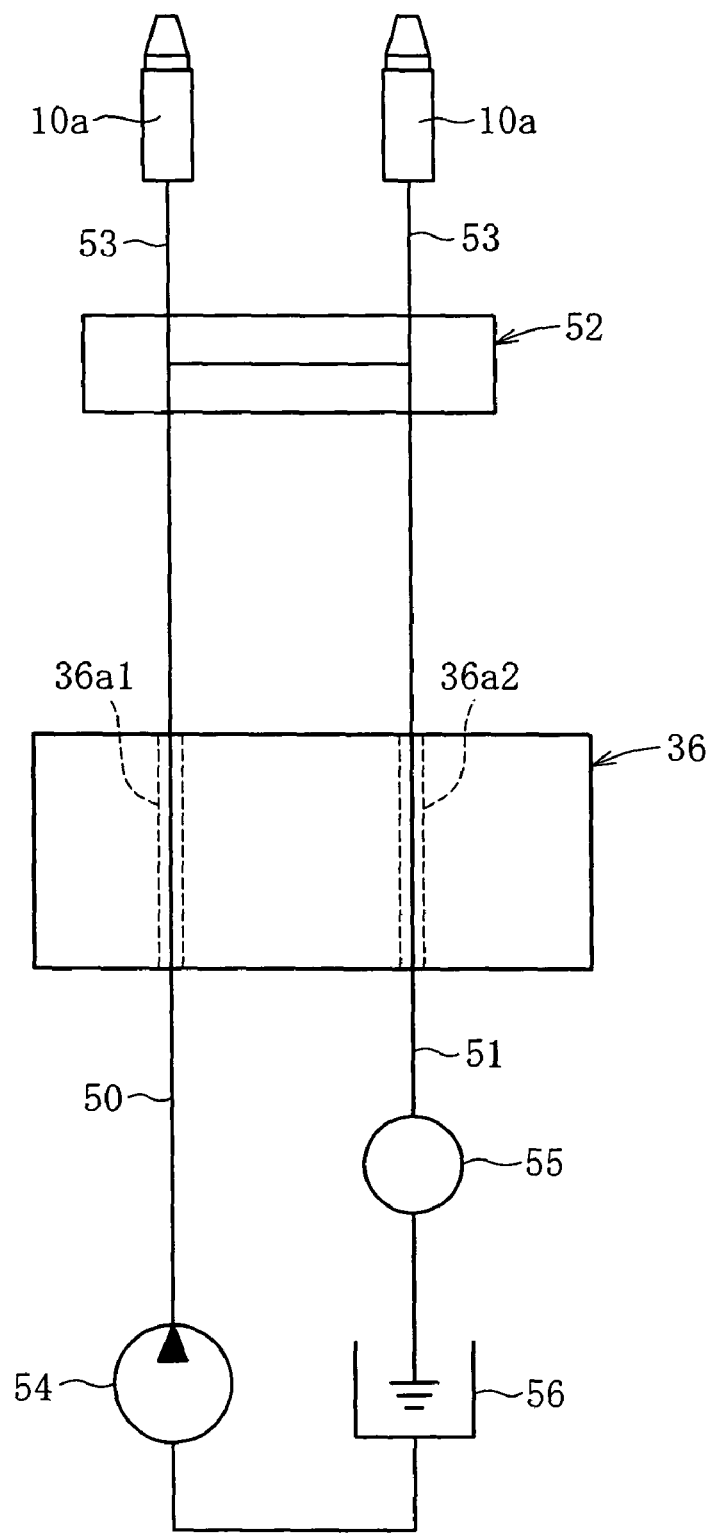
FIG. 14 shows an example of a tubing of a liquid tube for a spray solution.

The liquid tube holder 36 shown in FIG. 5 is used for sugar coating (or chocolate coating). The liquid tube holder 36 has two retention holes 36a1, 36a2 for allowing two liquid tubes (for example, two flexible solution hoses) to be inserted therethrough and holding them. For example, as shown in FIG. 14, among two retention holes, a solution sending hose 50 is inserted to be held in one retention hole 36a1, and a solution returning hose 51 is inserted to be held in the other retention hole 36a2. The solution sending hose 50 inserted to be held in the retention hole 36a1 and the returning solution hose 51 inserted to be held in the retention hole 36a2 are connected to, for example, a branch connection 52 on a downstream side, and a solution supply hose 53 is branched from the branch connection 52 to be connected to each spray nozzle 10a. Then, during spraying of a spray solution (while the spray nozzle 10a is opened), a spray solution fed under pressure from a pressure pump 54 enters from the solution sending hose 50 to the branch connection 52, and is branched from the branch connection 52 to each solution supply hose 53 to be supplied to each spray nozzle 10a. On the other hand, when the spray nozzle 10a is closed, a spray solution fed under pressure from the pressure pump 54 enters from the solution sending hose 50 to the branch connection 52, and passes through the solution returning hose 51 and a return valve 55 from the branch connection 52 to be returned to a solution tank 56.

A liquid tube holder 37 shown in FIG. 6 is used during film coating. In the case of film coating, a spray solution is sprayed uniformly onto a particle layer. Therefore, spray solutions are supplied from individual pressure pumps to the respective spray nozzles 10a. The liquid tube holder 37 has four retention holes 37a1, 37a2, 37a3, and 37a4 for allowing four liquid tubes (for example, four flexible liquid hoses) to be inserted therethrough and holding them. For example, among four retention holes 37a1, 37a2, 37a3, and 37a4, solution sending hoses are inserted to be held in two retention holes 37a1, 37a2, respectively, and solution returning hoses are inserted to be held in the remaining two retention holes 37a3 and 37a4, respectively. The solution sending hose inserted to be held in the retention hole 37a1 and the solution returning hose inserted to be held in the retention hole 37a3 are connected to a branch connection on a downstream side, and a solution sending hose is connected to one of the spray nozzles 10a from the branch connection. Furthermore, the solution sending hose inserted to be held in the retention hole 37a2 and the solution returning hose inserted to be held in the retention hole 37a4 are connected to the other branch connection on a downstream side, and a solution sending hose is connected from the branch connection to the other of the spray nozzles 10a. Then, during spraying of a spray solution (when the spray nozzles 10a are opened), the spray solutions fed under pressure from the respective pressure pumps enter from the solution sending hoses to the branch connection, respectively, and supplied from the branch connection to the respective spray nozzles 10a through the solution sending hoses. On the other hand, when the spray nozzles is closed, the spray solutions fed under pressure from the respective pressure pumps enter from the solution sending hoses to the branch connection, and return from the branch connection to the solution tank through the returning solution hoses. The liquid tube holder 37 in this embodiment is accommodated for the case of installing two spray nozzles 10a. In the case of installing three or more spray nozzles 10a, retention holes in the number corresponding to the number of the spray nozzles 10a which are installed may be provided. For example, in the case of installing three spray nozzles 10a, three retention holes are provided for a solution sending hose, and three retention holes are provided for a returning solution hose.

The liquid tube holder 36 shown in FIG. 5 and the liquid tube holder 37 shown in FIG. 6 are alternatively selected depending upon the kind of coating treatment, i.e., sugar coating (or chocolate coating) and film coating, and fitted in the attachment portion 34b11 of the second arm portion 34b (the main portion 34b1) shown in FIG. 4. The liquid tube holder 36 and the liquid tube holder 37 are both formed of silicon resin having a relatively large elasticity. Therefore, when the liquid tube holder 36 and the liquid tube holder 37 are fitted in the attachment portion 34b11 of the second arm portion 34b with an appropriate fastening allowance, they come into well contact with the attachment portion 34b11, and the effect of sealing the fitting portion with respect to the attachment portion 34b11 is obtained. Furthermore, by appropriately setting the hole diameter of the retention holes (36a1, 36a2, 37a1, 37a2, 37a3, 37a4) in accordance with the outer diameter of the solution sending hose or the solution returning hose, the effect of sealing the insertion portion of the solution sending hose or the solution returning hose is also obtained.

As represented by a chain line in FIG. 2, the front lid 31 can be opened/closed by being swung with respect to the swing axis 31c. Furthermore, by leaving the front lid 31 open, and swinging the swing arm 34 with respect to the swing axis 34c, the spray nozzle unit 10 is accommodated inside through the opening 5 of the rotary drum 2, and the spray nozzle unit 10 can be removed outside of the casing 4 through the opening 5 from the inside of the rotary drum 2. For example, in the case of exchanging the spray nozzle unit 10 in accordance with the kind, operation condition, and the like of coating, first, the front lid 31 is opened, and the swing arm 34 is swung while a grip 34b21 is held, whereby the spray nozzle unit is removed outside of the casing 4 from the inside of the rotary drum 2. Next, an air hose connected to each spray nozzle 10a is removed, and the screw fixture 10c connecting the nozzle support member 10b to the cleaning solution pipe 35 is loosened, whereby the spray nozzle unit 10 is removed from the swing arm 34. After this, when the liquid tube holder 36 (or 37) is removed from the attachment portion 34b11 of the second arm portion 34b, it can be removed as one cassette while the spray nozzle unit 10, the solution hose, and the liquid tube holder 36 (or 37) are assembled. Next, another cassette is prepared, in which a spray nozzle unit 10, a solution hose, and a liquid tube holder 36 (or 37) to be newly used are assembled, the liquid tube holder 36 (or 37) of the cassette is fitted in the attachment portion 34b11 of the second arm portion 34b, and the nozzle support member 10b is attached to the swing arm 34 (the cleaning solution pipe 35 in this example) with the screw fixture 10c. After this, an air hose is connected to each spray nozzle 10a of the spray nozzle unit 10.

As shown in FIGS. 8 and 9, the ventilation mechanism 6 is provided on the side of the back end of the rotary drum 2. The ventilation mechanism 6 includes a first disk plate 21 constituting the back end of the rotary drum 2 and a second disk plate 22 placed so as to be opposed to the first disk plate 21. The first disk plate 21 rotates together with the rotary drum 2, and the second disk plate 22 does not rotate. In this embodiment, the second disk plate 22 can slide in an axial direction with respect to the first disk plate 21.

Figure 10:
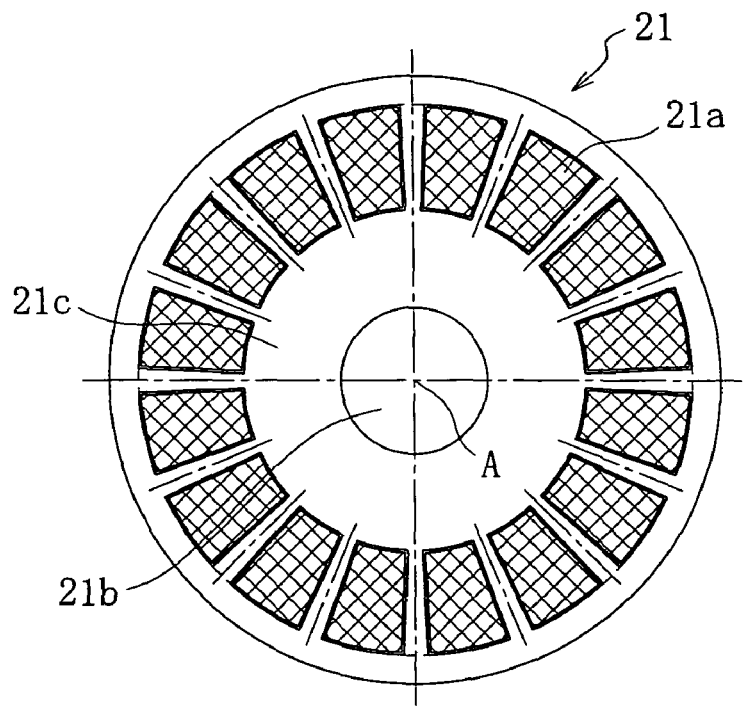
FIG. 10 is a front view (seen from the front) of a first disk plate.

As shown in FIG. 10, the first disk plate 21 has ventilation ports 21a composed of porous portions arranged along a single annular shape with the center being the axis A of the rotary drum 2, and the driving axis 3b shown in FIG. 1 is connected to an outer surface side (a back surface side) thereof. In this embodiment, the ventilation ports 21a are configured by attaching porous plates made of punching metal or the like respectively to a plurality of through-holes formed so as to be dispersed in a circumferential direction along the annular shape on the body of the first disk plate 21. The ventilation ports 21a may extend over the entire circumference of the annular shape. Furthermore, the outer circumferential edge of the ventilation ports 21a is substantially matched with the end on the inclination lower side of the peripheral wall portion 2a.

Furthermore, in a central region of an inner surface 21c of the first disk plate 21, a protrusion 21b is formed. In this embodiment, the protrusion 21b has a semi-spherical shape, and has a hollow shape, as shown in FIGS. 8 and 9. Furthermore, in this embodiment, the protrusion 21b is placed so that the center thereof is matched with the center (the axis A) of the inner surface 21c, and fixed to the inner surface 21c by appropriate means such as a bolt.

On the other hand, the second disk plate 22 is an annular plate having an outer diameter larger than that of the ventilation ports 21a of the first disk plate 21 and an inner diameter smaller than that of the ventilation ports 21a, and is slid in a direction along the axis A by a second air cylinder 19 as a plurality of (e.g., two) fluid-pressure cylinders. To be more specific, as shown in FIG. 8, on the back side of the second disk plate 22, the second air cylinder 19 is placed in parallel to the axis A on the inclined wall portion 4a1 of the inner partition wall portion 4a of the casing 4, and the tip end of a piston rod 19a of the second air cylinder 19 is connected to the second disk plate 22. Furthermore, as shown in FIG. 9, on the back side of the second disk plate 22, a plurality of (e.g., two) guide mechanisms 20 are placed. The guide mechanism 20 includes a guide member 20a fixed to the inclined wall portion 4a1 of the inner partition wall portion 4a of the casing 4, and a guide rod 20b slidably supported on the guide member 20a in a direction parallel to the axis A, and the second disk plate 22 is connected to the tip end of the guide rod 20b.

Figure 11:
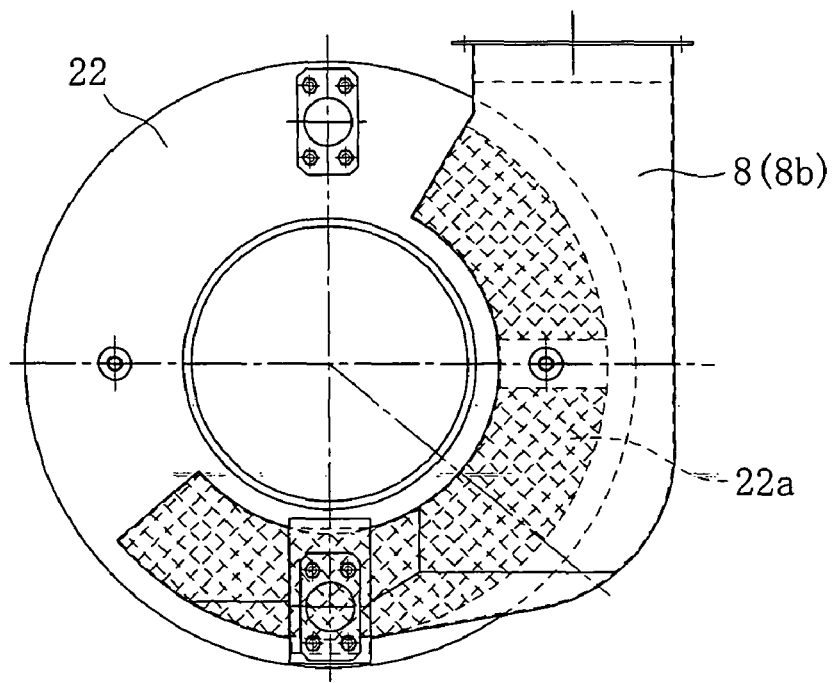
FIG. 11 is a view (seen from the back) of a second disk plate.

As shown in FIG. 11 (the second disk plate 22 is seen from the back side), communicating holes 22a are formed in a partial region of the second disk plate 22. In the case where the rotary drum 2 rotates in a counterclockwise direction in FIG. 11 during treatment of particles, the communicating holes 22a are formed in a region on a right diagonally lower side of the second disk plate 22 of FIG. 11. Generally, the communicating holes 22a of the second disk plate 22 are formed at a position overlapping the particle layer 11 during rotation of the rotary drum 2 (treatment of particles).

Furthermore, to the outer surface (back surface) of the second disk plate 22, ventilation ports of the ventilation duct 8 are connected so as to cover the communicating holes 22a, and the ventilation ports 21a of the first disk plate 21 communicates with the ventilation duct 8 at a predetermined position in which the ventilation ports 21a overlap the communicating holes 22a of the second disk plate 22. Thus, during rotation of the rotary drum 2, the inner space of the rotary drum 2 and the ventilation duct 8 communicate with each other at a predetermined position where the ventilation ports 21a of the first disk plate 21 and the communicating holes 22a of the second disk plate 22 overlap one another.

As represented by a solid line in FIG. 8, the second disk plate 22 is pressed by the expansion of the second air cylinder 19 during treatment of particles, and is opposed to the first disk plate 21 with a slight gap. The gap between the opposed surfaces of the first disk plate 21 and the second disk plate 22 are sealed with a labyrinth seal Rx. The labyrinth seal Rx is provided on an outer circumferential side and an inner circumferential side of the ventilation ports 21a of the first disk plate 21 and the communicating holes 22a of the second disk plate 22. As represented by a chain line in FIG. 8, during cleaning of the apparatus, inspection after cleaning, or the like, the second disk plate 22 is slid in the axial direction by the contraction operation of the second air cylinder 19, thereby being isolated from the first disk plate 21.

As shown in FIG. 1, the ventilation duct 8 is configured so as to be separated in the casing 4, and when the second disk plate 22 slides to be isolated from the first disk plate 21, the ventilation duct 8 is separated. To be more specific, the ventilation duct 8 includes a first portion 8a attached to an upper surface wall portion of the casing 4 and a second portion 8b attached to the second disk plate 22. During treatment of particles, a connection facet of the first portion 8a and a connection facet of the second portion 8b are connected to each other through the intermediation of a sealing member such as an O-ring attached to at least one connection facet. When the second disk plate 22 slides from such as a state to be isolated from the first disk plate 21, as represented by a chain line in FIG. 1, the second portion 8b moves together with the second disk plate 22 to be separated from the first portion 8a. At this time, the second portion 8b moves in the slide movement direction of the second disk plate 22 (i.e., in a diagonally lower direction along the axis A), so the separation of the first portion 8a and the second portion 8b is performed smoothly.

When particles (tablets, etc.) are coated using the coating apparatus 1 of this embodiment, treatment air such as dry air is supplied to/exhausted from the inside of the rotary drum 2 through the opening 5 at one end of the rotary drum 2 and the ventilation ports 21a at the other end thereof. In this embodiment, one end side of the rotary drum 2 is set to be an air supply side and the other end side thereof is set to be an exhaust side. In this case, the opening 5 at one end of the rotary drum 2 is a supply port (hereinafter, referred to as "supply port 5"), the ventilation duct 7 on one end side is a supply duct (hereinafter, referred to as "supply duct 7"), the ventilation ports 21a at the other end is exhaust ports (hereinafter, referred to as "exhaust ports 21a"), and the ventilation duct 8 on the other end side is an exhaust duct (hereinafter, referred to as an "exhaust duct 8"). Needless to say, depending upon the use condition, treatment condition, and the like, one end side of the rotary drum 2 can be set to be an exhaust side, and the other end side thereof can be set to be a supply side.

The particles such as tablets to be coated are injected into the rotary drum 2 through the opening 5 at one end of the rotary drum 2. When the rotary drum 2 is rotated by the rotation driving mechanism 3 around the axis A inclined at a predetermined angle θ with respect to a horizontal line, the particles in the rotary drum 2 are stirred and mixed along with the rotation of the rotary drum 2, whereby a particle layer (rolling floor) 11 is formed. The axis A of the rotary drum 2 is inclined at a predetermined angle θ, so the surface layer of the particle layer 11 is formed over the peripheral wall portion 2a of the rotary drum 2 and the first disk plate 21 at the back end in the axis A direction, as shown in FIG. 1, and in the rotation direction, is formed so as to be raised in an inclined shape from the back to the front of the rotation direction.

A spray solution such as a coating solution is sprayed from the spray nozzle 10a to the particle layer 11. The spray solution sprayed to the particle layer 11 is spread over the surface of each particle grain by the stirring and mixing function of the particle layer 11 involved in the rotation of the rotary drum 2.

The spray solution spread over the surfaces of the particle grains is dried by treatment gas (hot air, etc.) supplied to the inside of the rotary drum 2. This treatment gas flows in the rotary drum 2 from the ventilation ports 7a of the supply duct 7 through the supply port 5 at one end of the rotary drum 2, passes through the particle layer 11, and is discharged to the exhaust duct 8 through the exhaust port 21a of the first disk plate 21 and the communicating holes 22a of the second disk plate 22. When the treatment gas passes through the particle layer 11, the spray solution spread over the surface of each particle grain is dried uniformly without unevenness, and a coating film of high quality is formed.

Furthermore, during coating treatment, if required, by spraying cold water or hot water from a spray nozzle 14 provided on an upper surface wall portion of the casing 4 to the peripheral wall portion 2a of the rotary drum 2, the rotary drum 2 can be cooled or heated from the outer circumferential side. For example, the rotary drum 2 is cooled during sugar coating, and the rotary drum 2 is heated during chocolate coating, and the rotary drum 2 is cooled or heated depending upon the treatment condition during film coating. As cooling and heating means, cold air or hot air, a heater (e.g., an infrared heater), or the like may be used instead of cold water or hot water.

In the coating apparatus 1 of this embodiment, the axis A of the rotary drum 2 is inclined at a predetermined angle θ with respect to the horizontal line, whereby the volume amount of particles that can be treated in the rotary drum 2 becomes large. Therefore, the production efficiency can be enhanced by increasing the throughput for each treatment, compared with that of the conventional apparatus.

Furthermore, when the rotary drum 2 rotates around the inclined axis A, the particles accommodated in the rotary drum 2 flow under the condition of involving the movement in the rotation direction and the movement in the axial direction, along with the rotation of the rotary drum 2. Therefore, the effect of stirring and mixing a particle layer is high. In particular, in the rotary drum 2 of this embodiment, the peripheral wall portion 2a is formed in a polygonal tube shape, whereby an attempt is made so as to promote the flow of the particles in the rotation direction. Furthermore, the protrusion 21b is formed in a central region of the inner surface 21c at the other end (first disk plate 21) positioned on the inclination lower side of the rotary drum 2, and as schematically shown in FIGS. 8 and 9, the particles 11 in the vicinity of the other end (first disk plate 21) raised at the front in the rotation direction along with the rotation of the rotary drum 2 flow due to the dead weight (gravity), come into contact with the surface of the protrusion 21b when returning to the back in the rotation direction, and is guided to the surface of the protrusion 21b to flow to the inclination upper side. Therefore, the phenomenon in which the particles 11 in the vicinity of the other end (first disk plate 21) is unlikely to occur. Then, owing to these flow promotion effects (stirring and mixing promotion effects), the local excess wetting, dry unevenness, and the like of the particle layer 11 are prevented, which enhances the quality of coating treatment and the production yield.

The particle products subjected to coating treatment are automatically discharged from the inside of the rotary drum 2, for example, in an embodiment described below.

Figure 12A:
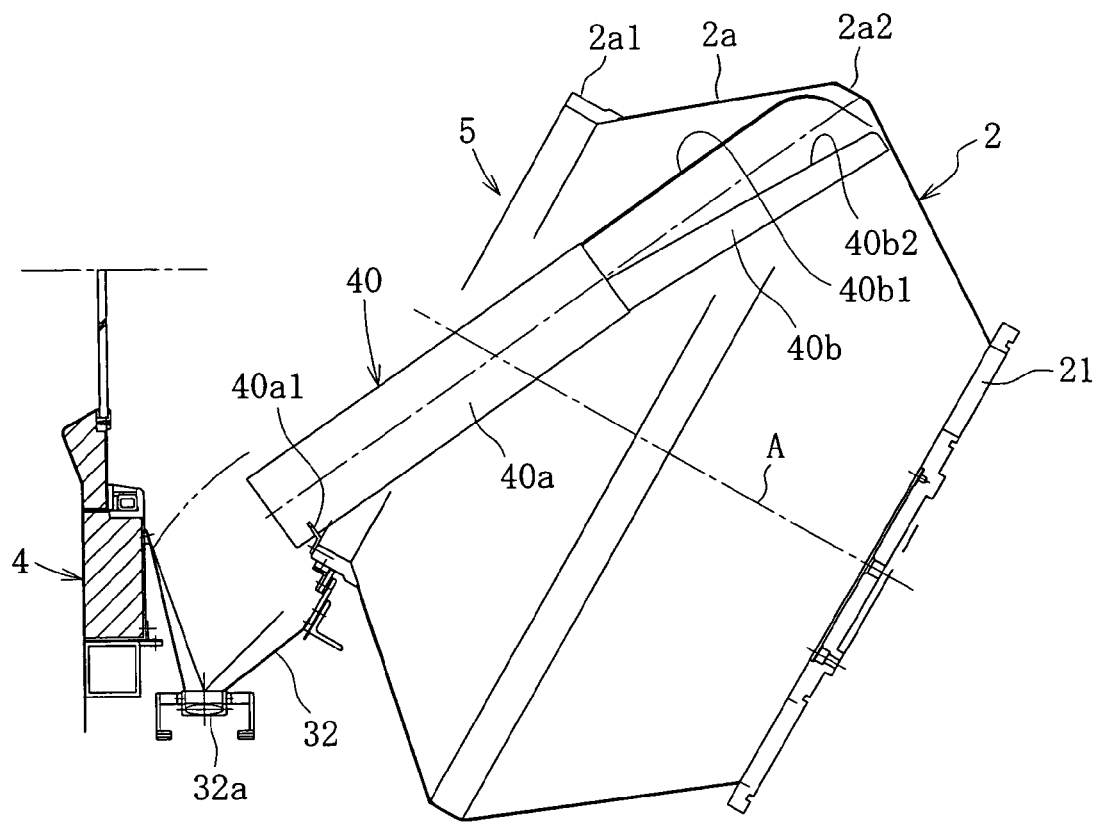
FIG. 12A is a partial cross-sectional view showing a state in which the rotary drum is attached to a discharging member.
Figure 12B:
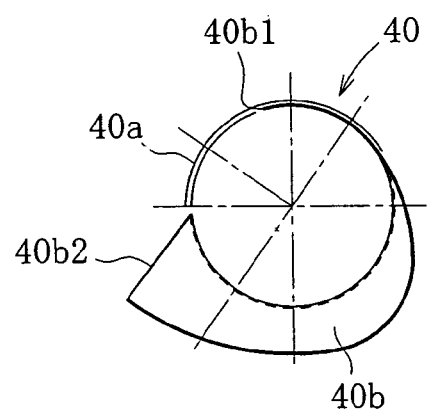
FIG. 12B is a front view of the discharging member.

As shown in FIG. 12, after the coating treatment is completed, the rotation of the rotary drum 2 is stopped, and a discharging member 40 is placed in the rotary drum 2. The discharging member 40 is composed of a guide portion 40a formed in a tube shape, and a pick-up portion 40b provided at the tip end of the guide portion 40a. The pick-up portion 40b has a front edge 40b1 positioned in a rotation direction front side with respect to the rotation direction of the rotary drum 2 during discharge, and a back edge 40b2 positioned on a rotation direction back side. The front edge 40b1 of the pick-up portion 40b is placed so as to come into contact with the inner surface of the rotary drum 2, or is placed so as to have a slight gap with respect to the inner surface of the rotary drum 2. The gap in this case is set to be such a size that particle products cannot pass there through. The discharging member 40 is placed under the condition of being inclined in the rotation direction with respect to the axis A of the rotary drum 2, and an attachment leg 40a1 provided on a tip end outer circumferential portion of the guide portion 40a is attached to the annular portion 2a1 in the front edge of the rotary drum 2 with a bolt or the like.

After the discharging member 40 is attached to the rotary drum 2, the rotary drum 2 is rotated in a predetermined direction. Then, the discharging member 40 rotates in a predetermined direction together with the rotary drum 2, and the particle products in the rotary drum 2 are picked up by the front edge 40b1 of the pick-up portion 40b. The particle products thus picked up slides down, due to the dead weight, the inner surface of the pick-up portion 40b along with the rotation of the discharging member 40 to enter the guide portion 40a, and passes through the inside of the guide portion 40a to be discharged to the discharging bucket 32. Then, the particle products are discharged from the discharging port 32a of the discharging bucket 32 to the discharging chute 33 shown in FIG. 1. During discharge of the particle products, the discharging chute 33 is partially pulled out from the casing 4 so that the discharging port 33a is positioned outside the casing 4. Furthermore, a container (not shown) for accommodating the particle products are set below the discharging chute 33.

Figure 13A:
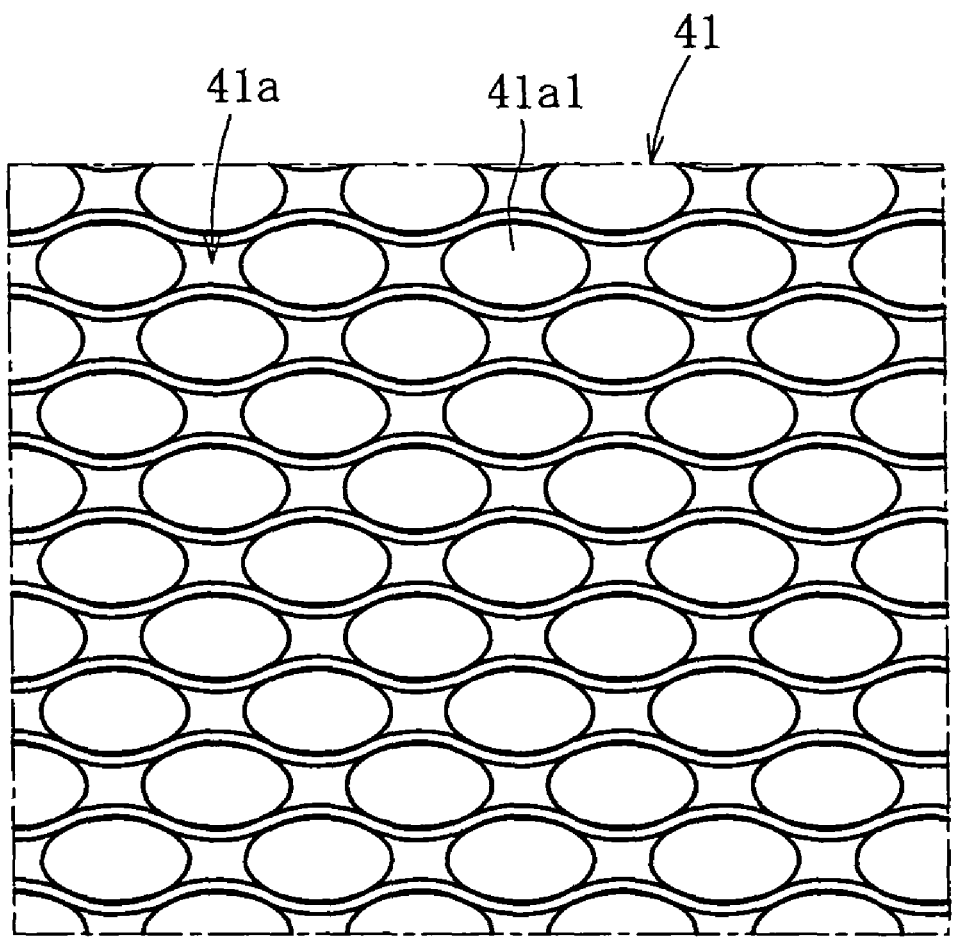
FIG. 13A is a schematic plan view of a stainless steel plate constituting a discharging path.
Figure 13B:
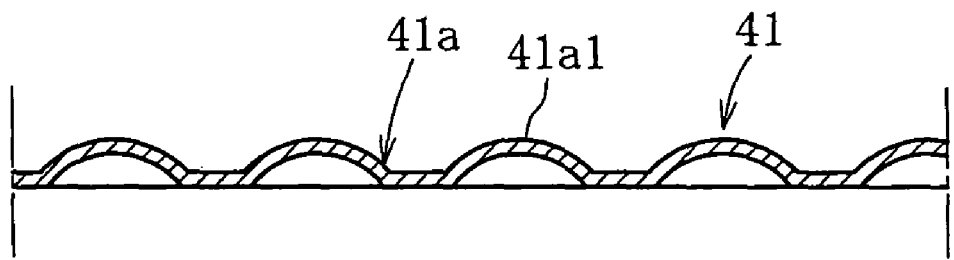
FIG. 13B is a cross-sectional view of the stainless steel plate constituting a discharging path.

As described above, the particle products are discharged outside the apparatus through a discharging path (i.e., discharging member 40 → discharging bucket 32 → discharging chute 33). Depending upon the shape, property, discharge amount per unit time, and the other conditions of the particle products, the particle products may remain in the discharging path, with the result that efficient discharge cannot be performed. In this embodiment, the pick-up portion 40b of the discharging member 40, the discharging bucket 32, and the discharging chute 33 constituting the discharging path are formed of a metal plate 41 having a surface 41a with unevenness for enhancing a sliding property (e.g., a stainless steel plate), as shown in FIG. 13. The stainless steel plate 41 shown in FIG. 13 is obtained by pressing a stainless steel flat plate and forming a number of partially spherical or partially elliptical convex portions 41a1 as curved protrusions on one surface 41a, and is commercially available from, for example, Takasago Tekko K.K. as Trade Name, "Runner Stainless".

By forming the pick-up portion 40b of the discharging member 40, the discharging bucket 32, and the discharging chute 33, using the above-mentioned stainless steel plate 41, and forming the inter surfaces thereof, using the surface 41a with unevenness for improving a sliding property, particle products do not remain in the discharging path, whereby efficient discharge can be performed.

What is claimed is:

1. A coating apparatus comprising:
   a rotary drum in which particles to be treated are accommodated;
   a casing in which the rotary drum is accommodated; and
   a spray nozzle unit, wherein:
   the rotary drum is rotatable around an axis inclined with respect to a horizontal line, and has an opening at one end on an inclination upper side;
   the spray nozzle unit is removably attached to a swing arm; and
   the swing arm is swingable around a swing pivot provided at the casing such that the spray nozzle unit is capable of being moved between a position inside of the rotary drum and a position outside of the rotary drum.

2. A coating apparatus according to claim 1, further comprising:
   a liquid tube holder for holding a liquid tube of a spray solution connected to the spray nozzle unit,
   wherein the liquid tube holder is removably attached to the swing arm.

3. A coating apparatus according to claim 2, further comprising:
   a discharging mechanism for discharging particle products which have undergone coating treatment from an inside of the rotary drum,
   wherein at least a partial surface of a discharging path of the particle products is formed of a surface with unevenness for improving a sliding property.

4. A coating apparatus according to claim 1, further comprising:
   an air tube of compressed air to be connected to the spray nozzle unit,
   wherein the air tube is inserted in the swing arm.

5. A coating apparatus according to claim 3, further comprising:
   a discharging mechanism for discharging particle products which have undergone coating treatment from an inside of the rotary drum,
   wherein at least a partial surface of a discharging path of the particle products is formed of a surface with unevenness for improving a sliding property.

6. A coating apparatus according to claim 1, further comprising:

a discharging mechanism for discharging particle products which have undergone coating treatment from an inside of the rotary drum, wherein at least a partial surface of a discharging path of the particle products is formed of a surface with unevenness for improving a sliding property.

7. A coating apparatus according to claim 2, further comprising:

an air tube of compressed air to be connected to the spray nozzle unit, wherein the air tube is inserted in the swing arm.

8. A coating apparatus according to claim 7, further comprising:

a discharging mechanism for discharging particle products which have undergone coating treatment from an inside of the rotary drum, wherein at least a partial surface of a discharging path of the particle products is formed of a surface with unevenness for improving a sliding property.

* * * * *